United States Patent
Storaasli

[19]

[11] Patent Number: 5,875,685

[45] Date of Patent: Mar. 2, 1999

[54] MULTI-AXIS POSITIONER WITH BASE-MOUNTED ACTUATORS

[75] Inventor: Allen G. Storaasli, Hermosa Beach, Calif.

[73] Assignee: Hughes Electronics Corporation, El Segundo, Calif.

[21] Appl. No.: 825,823

[22] Filed: Mar. 31, 1997

[51] Int. Cl.$^6$ .............................. G05G 11/00; H01Q 3/00
[52] U.S. Cl. ..................... 74/490.1; 74/490.2; 343/757
[58] Field of Search .............................. 74/490.1, 490.07, 74/490.06, 490.05, 490.15, 86, 89.12, 89.11, 89.13, 502.1, 417; 108/20, 89.18; 343/765, 757, 767, 758, 763, 766; 342/359

[56] References Cited

U.S. PATENT DOCUMENTS

| | | | |
|---|---|---|---|
| 3,202,015 | 8/1965 | Moul, Jr. et al. | 343/767 |
| 3,287,981 | 11/1966 | Wolfe | 74/86 |
| 3,987,452 | 10/1976 | Godet | 343/765 |
| 4,304,381 | 12/1981 | Lloyd . | |
| 4,490,724 | 12/1984 | Bickman . | |
| 4,558,325 | 12/1985 | Strom . | |
| 4,580,461 | 4/1986 | Sears . | |
| 4,584,896 | 4/1986 | Letovsky | 74/490.1 |
| 4,609,083 | 9/1986 | Stuhler . | |
| 4,884,465 | 12/1989 | Zachystal | 74/86 X |
| 4,907,009 | 3/1990 | Pinson . | |
| 4,920,350 | 4/1990 | McGuire . | |
| 5,243,873 | 9/1993 | Demers | 74/490.06 |
| 5,359,337 | 10/1994 | Eguchi | 343/765 |
| 5,396,815 | 3/1995 | Polites . | |
| 5,469,182 | 11/1995 | Chaffee . | |
| 5,633,647 | 5/1997 | Tines | 343/766 |

FOREIGN PATENT DOCUMENTS

WO 08900052  6/1989  WIPO .............................. 74/490.06

*Primary Examiner*—Charles A. Marmor
*Assistant Examiner*—Marcus Charles
*Attorney, Agent, or Firm*—Georgann S. Grunebach; M. W. Sales

[57] ABSTRACT

A positioner includes an output platform and a two axis bearing-suspension which permits the output platform to rotate about two orthogonal axes. The output platform is positioned by a pair of actuators which are mounted, as is the bearing suspension, to a positioner base. The actuators include bevel gears which engage ratchets to couple the actuators and the platform.

12 Claims, 2 Drawing Sheets

MULTI-AXIS POSITIONER WITH BASE-MOUNTED ACTUATORS

GOVERNMENT RIGHTS

This invention was made with Government support under Contract No. F33657-88-C-4061 awarded by the Government. The Government has certain rights in this invention.

BACKGROUND OF THE INVENTION

Field of the Invention

The invention relates to multi-axis positioners and, in particular, to positioners which employ multi-axis gimballing arrangements.

Description of the Related Art

Positioners employing multi-axis gimbal mounts are widely used for positioning antennas, optical sensors, scientific instruments, lasers, and other such devices. Gimbal mounts provide relative ease of movement so that, for example, a gimbal-mounted satellite antenna may be positioned to track a fixed target on earth as the satellite drifts by overhead or to track another satellite antenna. As the target moves relative to the gimbal-mounted antenna, the antenna is moved to maintain the target within the antenna's relatively narrow beam. To be effective, especially over long distances, this positioning must be precise and stable. For example, if a gimbal-mounted device is gathering optical data on electroluminescence within an ocean, a minor misdirection of the space-based platform carrying the optical device could mean a substantial location error (on the order of miles) at the ocean's surface.

To avoid pointing errors, antennas or instruments are isolated, as much as possible, from their host aircraft such as a satellite, re-entry vehicle or high-altitude airplane. To this end, the gimbal/instrument system is balanced to reduce the system's moment of inertia. Position feedback is generally provided to a position control system to effect precise positioning. Even the cables which provide electronic signal interchange and power transfer between the instrument platform and the aircraft are routed in a manner which minimizes the forces they exert upon the platform.

In spite of these extensive efforts, conventional systems are inherently heavier, less reliable, and more difficult to position than a simpler system would be. One common approach is to have one motor base mounted and another motor mounted on and moving with the platform of the first axis output. This results in heavier total gimballed "payload" mass, which could degrade performance capability. Additionally, the system weight is higher in this case because the first axis platform must accommodate the mounting of the motor, and the first axis support bearings must be sized to include the motor weight for the launch vibration environment. Another approach has both gimbals base mounted, but requires the complexity of a slider which is required to couple motion from one motor. Such systems are susceptible to backlash, manufacturing complexity, and wear. Backlash and friction uncertainties can complicate the design of an associated position control system.

SUMMARY OF THE INVENTION

The invention is directed to a multi axis positioner system that provides accurate positioning and position indication. By base-mounting the drives and coupling them through a novel gearing approach, the invention minimizes system weight. The reduction in payload mass properties, because neither motor is gimballed, allows easier launch-locking in satellite applications and greater positioning agility. Launch locking may be achieved, for example, simply by inserting a rod through a base wall into a positioner platform.

The invention includes a base bearing-mount, which may be attached to a base, such as a satellite structure. The mount includes a shaft which is rotatable about an axis, the shaft being supported by bearings which permit low resistance rotation of the shaft. Similarly, a platform bearing-mount, including bearings and a housing for the bearings, is attached to the shaft of the base bearing-mount so that its shaft may rotate in a direction which is orthogonal to the rotational direction of the base bearing-mount. A platform may be attached to or may be an integral part of the platform bearing-mount. In a preferred embodiment, the platform includes a flat rectangular surface to which an instrument, antenna, etc. may be attached.

The base bearing-mount and platform each include an output gear face, or ratchet, which mates with a bevel gear pinion coupled to an motor through a rotatable shaft. In a preferred embodiment the actuators are a stepper motors with bevel gears mounted directly on the motor shafts, but the bevel gears may alternatively be coupled to the motor shafts through a gear train for example. Each bevel gear pinion defines a cone and the vertexes of these cones intersect at the rotational center of the positioner. The platform and base bearing-mount ratchets each subtend an arc, the radii of which extend from the ratchet gear face to the positioner's center of rotation. Rotational movement of the actuators are converted to excursions along these arcs which translates into movement of the platform about the arcs' center. Additionally, in the preferred embodiment a position indicator such as a rotary potentiometer is coupled to each bearing-mount shaft in order to provide position feedback which may be used, for example, by a position control system.

These and other features, aspects and advantages of the invention will be apparent to those skilled in the art from the following detailed description, taken together with the accompanying drawings.

DETAILED DESCRIPTION OF THE INVENTION

The invention is directed to a multi-axis gimballed positioning system. The gimbal systems to which the invention pertains generally include a platform suspended by gimbals from a base. Typically, gimbal-mounted devices, e.g., instruments, antennas, etc., are affixed to the platform and the base is attached to, or is a component of, a satellite or other aircraft which employs the device. The multi-gimbal suspension system permits relatively easy movement of a platform mounted device about two orthogonal axes. Gimbals are known in the art. A brief discussion of them may be found in *Van Nostrand's Scientific Encyclopedia*, Seventh Edition, Douglas M. Considine, P. E. Editor, Van Nostrand Reinhold, New York, 1989, at page 1336.

The invention includes a platform mounted on a bearing-mount which permits rotation in one axis. The platform bearing-mount is suspended from a base bearing-mount which is attached to, or, in the preferred embodiment, is integral to, a base and permits rotation about an axis orthogonal to that of the platform bearing-mount. Actuators which include bevel gear drives are located upon the base and, through mating relation with ratchets located on the platform and on the platform bearing-mount, the bevel gears rotate the platform as desired. In a preferred embodiment position sensors are attached to the bearing-mounts to provide direct measurements of the platform's rotational position. Because actuators are directly coupled to the platform and base-bearing mounts, the new positioner provides "direct drive" positioning. Much as a direct-drive turntable eliminates the backlash and other undesirable positioning artifacts of a belt-driven turntable, the new positioner permits relatively easy, precise, positioning of a multi-axis gimbal mounted system.

Figure 1:
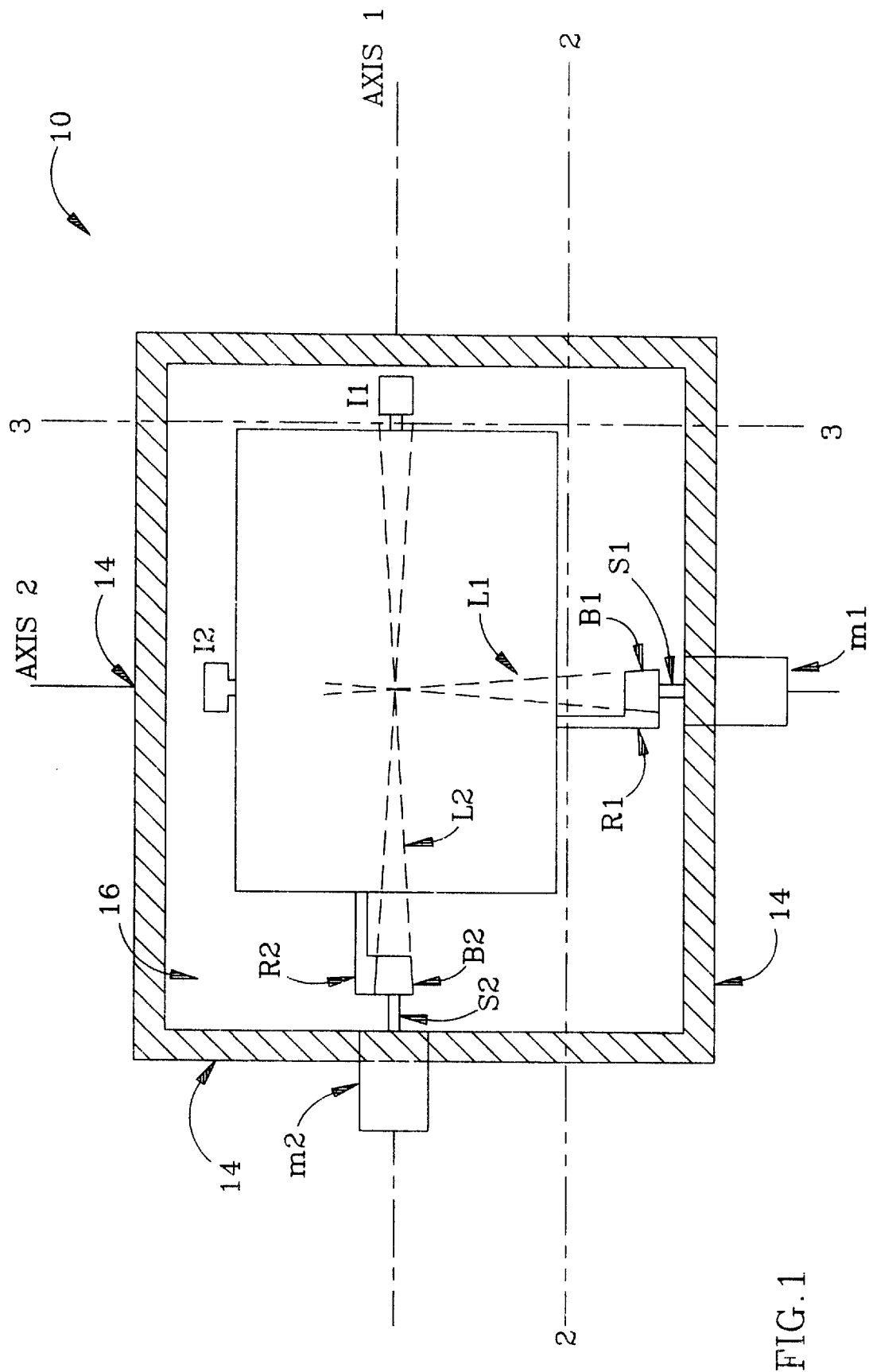
FIG. 1 is a top plan view of a gimbal mounted positioning system in accordance with the invention.

The top plan view of FIG. 1 illustrates a preferred embodiment of the new positioner 10. A platform 12 is rotatable about axes AXIS1 and AXIS2 under control of motors M1 and M2, respectively. Respective bevel gear pinions B1 and B2 are mounted on the shafts S1 and S2 of the motors M1 and M2 and mate with ratchets R1 and R2. The rotational movement of the bevel gear pinions about the axes of their respective shafts is translated into rotational movement about an axis which is perpendicular to the shaft. For example, as the bevel gear pinion B1 rotates around the shaft S1, for example, an arcuate motion is imparted to the ratchet R1 which translates the platform about axis AXIS1 which is perpendicular to the axis of motor M1. Similarly, rotational movement of the bevel gear pinion B2 about the axis of shaft S2 is translated into rotational of the platform about the axis AXIS2, perpendicular to the axis of motor M2. In the preferred embodiment the ratchet R2 is integral to the platform 12 and the ratchet R1 is integral to a platform bearing-mount which will be discussed in greater detail in relation to FIG. 2.

A base, including walls 14 and plate 16, supports the remainder of the positioning system 10. In particular, the motors M1 and M2 are mounted in the walls 14 by brackets or other such fixtures known in the art. Position indicators I1 and I2 are mounted on the shafts of platform and base bearing-mounts, which will be discussed in greater detail in relation to FIGS. 2 and 3. In the preferred embodiment the position indicators are rotary potentiometers which vary the resistance between a stationary and wiper terminal in relation to the indicators' shaft positions. Such indicators are known in the art. For a discussion of these and other resistive position indicators see Harry L Trietley, *Transducers in Mechanical and Electronic Design*, Marcel Dekker, Inc., New York, N.Y., 1986 pp 21–27. By placing indicators to directly measure the positioner's angular movement, the indicators can typically provide 0.5° measurement accuracy.

The bevel gear pinions B1 and B2 define respective cones C1 and C2, and the vertexes of the cones intersect at the rotational center of the platform/mount combination. Due to this arrangement, i.e., the intersection of the bevel gear pinion cone vertexes, each motor can rotate the platform about its respective axis without interfering with the other motor/gear combination. This prevents the actuators from seizing-up when they are rotated. For a given rotational change in position of the motor M1, the base ratchet/positioner angle $\phi_1$ changes by a proportional amount. Similarly, for a given rotational change in position of the motor M2, the platform ratchet/positioner angle $\phi_2$ changes by an amount proportional to both the M2 angular change and the base ratchet/positioner angle. More specifically, the angular positions $\phi_1$, $\phi_2$ of output axes 1 and 2 are given by:

$$\phi_1 = (A)(M1 \text{ angle}) \quad (1)$$

$$\phi_2 = (B)[(M2 \text{ angle}) + \phi_1] \quad (2)$$

where:

A = a proportionality constant between motor M1's change in angular position and the resultant angular change of an arc swept out by the base ratchet/positioner center of rotation.

B = a proportionality constant between motor M2's change in angular position and the resultant angular change of an arc swept out by the platform ratchet/positioner center of rotation.

The cross-coupling between the position of AXIS1 and AXIS2 evidenced by equation 2 must be taken into account in order to properly position the platform 12 in both axes.

Figure 2:
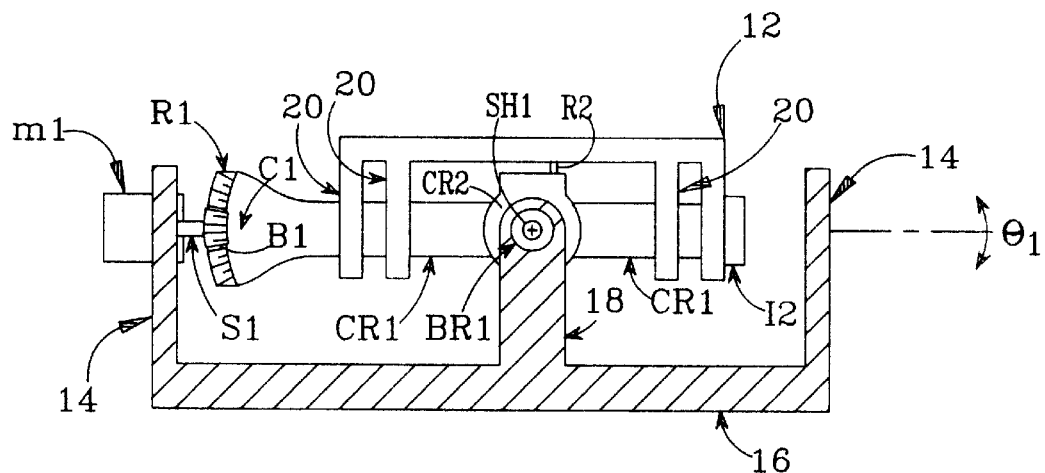
FIG. 2 is a sectional view along the line 2—2 of the positioning system of FIG. 1.

The sectional view of FIG. 2 is taken along the line 2—2 of FIG. 1 and like components are given like designations. As indicated in the discussion related to FIG. 1, in the preferred embodiment the motor M1 is mounted in a wall 14 and a bevel gear pinion B1 is attached to the motor shaft S1. The bevel gear pinion B1 engages a ratchet R1 and, through its rotational motion, effects translational motion of the ratchet R1. The ratchet R1 is combined with a base shaft that includes cross members CR1 and CR2 which are orthogonal to one another.

Cross member CR1 moves as a unit with cross member CR2. However, CR1 forms a shaft for rotation about AXIS2 and cross member CR2 is itself supported by shafts which permit rotation around AXIS1 which is perpendicular to the plane of FIG. 2. A shaft for AXIS1, SH1, extends into a base support 18 where it is supported by bearings BR1. Similarly, the platform 12 includes extensions 20 which surround the shaft CR1 and are supported from the shaft CR1 by bearings BR2 which they house, as discussed in relation to FIG. 3. A position indicator 12 measures the relative rotational movement $\phi_2$ of the platform 12 with respect to the shaft CR1.

Figure 3:
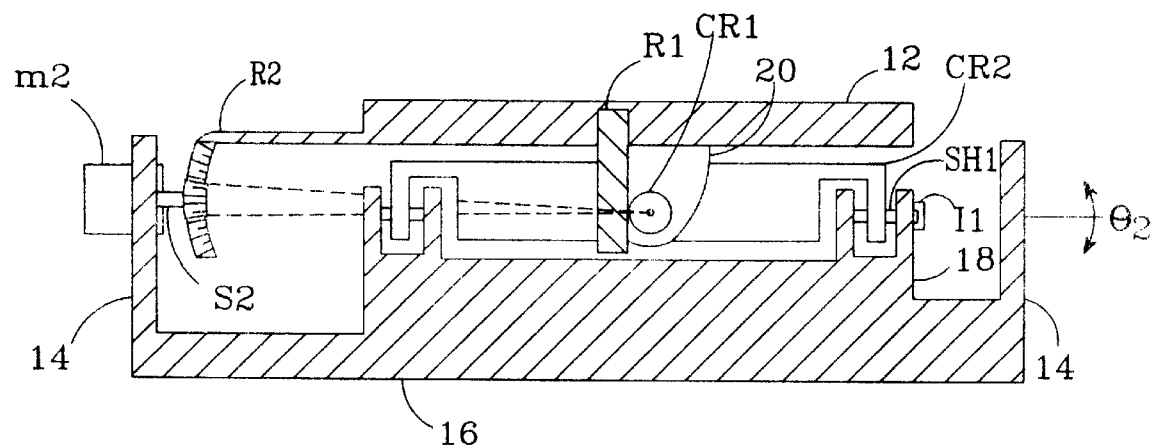
FIG. 3 is a sectional view along the line 3—3 of the positioning system of FIG. 1.

The sectional view of FIG. 3 is taken along the line 3—3 of FIG. 1 and like components are given like designators. Motor M2 is supported by the base wall 14 and its shaft S2 has a bevel gear pinion B2 attached to it. The bevel gear pinion B2 engages the ratchet R2 which, in the preferred embodiment, is integral to the platform 12. Rotational motion about the shaft S2 is translated into rotational motion about the axis AXIS2, perpendicular to the plane of FIG. 3, through the bevel gear pinion B2/ratchet R2 combination. As noted above, the vertex of the cone C2 defined by the bevel gear pinion B2 intersects that of bevel gear pinion B1. As described in relation to FIG. 2, the base support 18 houses bearings which support shafts SH1 and SH2 and permit their low resistance rotation. The shafts SH1, SH2 support the two cross members CR1 and CR2 which comprise the base shaft structure. Position indicator I1 is mounted to the shaft SH1 and measures the relative rotational movement $\phi_1$ between the shaft SH1 and the base support 18.

In summary, the platform 12 is supported by a platform bearing-mount which includes extensions 20 that surround a shaft CR1 and are supported from the shaft CR1 by bearings BR2. The platform bearing-mount permits the platform to rotate about an axis AXIS2. The base bearing mount includes a base shaft structure which includes two cross members CR1 and CR2 and a ratchet R1 which rotate together about an axis AXIS1 and are supported by bearings BR1 in a support 18. The rotary motion of motor M1, which in one alignment of the platform 12 coincides with rotation about AXIS2, is translated by a ratchet R1 into rotation about an axis AXIS1 which is orthogonal to the M1 motor shaft's rotational axis.

The forgoing description of specific embodiments of the invention has been presented for the purposes of illustration and description. It is not intended to be exhaustive or to limit the invention to the precise forms disclosed, and many modifications and variations are possible in light of the above teachings. For example, although stepper motors are preferred for the ease with which they may be controlled, other types of motors may be used in combination with the bevel gears. Additionally, the output platform may take on many configurations; it needn't be an essentially flat rectangular plate as illustrated, but could take the form of an annular ring or any other convenient form. The bevel gears may be attached directly to the shafts of the actuator motors or they may be coupled through a gear train to the motor shafts, but the vertexes of the cones which the bevel gears define should intersect at the rotational center of the positioner system. The platform and base mount ratchets may be integral to their respective associated structures or they may be attached using conventional fasteners such as bolts, for example. The embodiments were chosen and described in order to best explain the principles of the invention and its practical application, to thereby enable others skilled in the art to best utilize the invention. It is intended that the scope of the invention be limited only by the claims appended hereto.

I claim:

1. A multi-axis positioner, comprising:
   a platform,
   a base, and
   at least two actuators mounted on said base, said actuators having respective axes of rotation which are orthogonal to each other and further being coupled to said platform through respective bearing-mounts so that each actuator is capable of rotating the platform about an axis of rotation which is orthogonal to its own associated axis of rotation, each of said actuators comprising a motor having a shaft coupled to a bevel gear, with each bevel gear defining a cone and the vertices of these cones intersecting at the center of rotation of the positioner, said intersection of vertices enabling each of said motors to rotate said platform about its respective axis independent of the motion of the other motor/gear combinations.

2. A multi-axis positioner, comprising:
   a platform,
   a base,
   actuators mounted on said base, said actuators having respective axes of rotation and further being coupled to said platform through bearing-mounts so that each actuator is capable of rotating the platform about an axis of rotation which is orthogonal to its own associated axis of rotation, each of said actuators comprising a motor having a shaft coupled to a bevel gear, with each bevel gear defining a cone and the vertexes of these cones intersecting and forming the center of rotation of the positioner, and
   a planer ratchet associated with said platform which couples rotational motion of a first one of the motors into rotation about an axis orthogonal to that of the first motor's shaft.

3. The positioner of claim 2, further comprising:
   a base ratchet which couples rotational motion of a second one of the motors into rotation about an axis orthogonal to that of said second motor's shaft.

4. The positioner of claim 3, wherein the rotational axes of said motors are orthogonal to one another.

5. The positioner of claim 4, wherein said bevel gears are mounted directly upon said motor shafts.

6. A multi-axis positioner, comprising:
   a platform,
   a platform bearing-mount configured to support said platform and to permit rotation of said platform about a first-axis,
   a base,
   a base bearing-mount configured to support said platform bearing mount from said base and to permit rotation of said platform bearing mount about a second axis orthogonal to said first axis, and
   actuators mounted on said base, each of said actuators having a shaft coupled to a bevel gear with each bevel gear defining a cone and the vertices of these cones intersecting at the center of rotation of the positioner said intersection of vertices enabling each of said actuators to rotate said platform about its respective axis independent of the motion of the other motor/gear combinations, said bevel gear actuators mounted on said base in coupling relation between said base, said platform, and said base bearing-mount such that said actuators may rotate said platform about said first and second axes.

7. The positioner of claim 6, wherein said actuators comprise:
   stepper motors having rotatable shafts, with bevel gears coupled to said shafts.

8. The positioner of claim 7, wherein said bevel gears are directly affixed to said motor shafts.

9. A multi-axis positioner, comprising:
   a base with an associated ratchet and a base bearing-mount,
   a platform with an associated ratchet and a platform bearing-mount,
   platform and base actuators mounted orthogonally to one another upon said base, each actuator comprising a motor and a bevel gear, there being a ratio A associated with the angular displacement of the shaft of said base motor and the angular displacement about an axis orthogonal to the axis of rotation of said platform bevel gear, and a ratio B associated with the angular displacement of the shaft of said platform motor and angular displacement about an axis orthogonal to the axis of rotation of said base bevel gear, each of said bevel gears defining a cone and the vertices of these cones intersecting at the center of rotation of the positioner, said intersection of vertices enabling each of said actuators to rotate said platform about its respective axis independent of the motion of the other motor/gear combinations.

10. The positioner of claim 9, wherein the value of the base ratchet/positioner angle $\phi_1$ equals the product of the ratio A and the base motor angular position.

11. The positioner of claim 10, wherein the value of the platform/positioner angle $\phi_2$ is the product of the ratio B and the sum of the angle of said platform motor and the base ratchet/positioner angle.

12. The positioner of claim 11, wherein one position indicator is coupled to said platform bearing-mount and another position indicator is coupled to said platform bearing-mount, each indicator coupled to provide a direct indication of said angles.

* * * * *